(12) United States Patent
Luo et al.

(10) Patent No.: US 9,683,840 B2
(45) Date of Patent: Jun. 20, 2017

(54) DEVICE FOR DETECTING THICKNESS OF SHEET-TYPE MEDIUM AND METHOD THEREOF

(71) Applicant: GRG Banking Equipment Co., Ltd., Guangzhou, Guangdong (CN)

(72) Inventors: Panfeng Luo, Guangzhou (CN); Rongqiu Wang, Guangzhou (CN); Chaoyang Xu, Guangzhou (CN); Ming Li, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 558 days.

(21) Appl. No.: 14/353,482

(22) PCT Filed: Apr. 1, 2013

(86) PCT No.: PCT/CN2013/073549
§ 371 (c)(1),
(2) Date: Apr. 22, 2014

(87) PCT Pub. No.: WO2013/185501
PCT Pub. Date: Dec. 19, 2013

(65) Prior Publication Data
US 2014/0309958 A1 Oct. 16, 2014

(30) Foreign Application Priority Data
Jun. 11, 2012 (CN) .......................... 2012 1 0191067

(51) Int. Cl.
*G01D 18/00* (2006.01)
*G01D 21/00* (2006.01)
(Continued)

(52) U.S. Cl.
CPC ............. *G01B 21/08* (2013.01); *G07D 7/164* (2013.01)

(58) Field of Classification Search
CPC ............ B65H 2408/13; B65H 2553/20; B65H 2553/80; B65H 2601/11;
(Continued)

(56) References Cited

U.S. PATENT DOCUMENTS 4,700,368 A   10/1987   Munn et al.
2002/0113160 A1*   8/2002   Niioka ................. B65H 29/006
                                                                  242/528

(Continued)

FOREIGN PATENT DOCUMENTS

CN   101158569 A   4/2008
CN   101397098 A   4/2009
(Continued)

OTHER PUBLICATIONS

Supplementary European Search Report dated Apr. 23, 2015 and European Search Opinion from corresponding European Application 13804529.
(Continued)

*Primary Examiner* — Roy Y Yi
(74) *Attorney, Agent, or Firm* — Wolf, Greenfield & Sacks, P.C.

(57) ABSTRACT

A method and a device for continuously detecting thickness of a sheet-type medium in a continuous conveying process can achieve a more accurate and stable detected thickness value. The device for detecting thickness of a sheet-type medium comprises a conveying roller; a detection roller, the detection roller being arranged opposite to the conveying roller, and an elastic displacement existing between the detection roller and the conveying roller; a plate spring, arranged by pressing opposite to the other side of the detection roller relative to the conveying roller; a sensor, arranged above the plate spring; and a thickness calculation unit, calculating a thickness value of the sheet-type medium according to a distance detection value and a standard zero value; and further comprises a zero value correction unit.

13 Claims, 3 Drawing Sheets

(51) Int. Cl.
  *G01P 21/00* (2006.01)
  *G01R 35/00* (2006.01)
  *G01B 21/08* (2006.01)
  *G07D 7/164* (2016.01)

(58) Field of Classification Search
  CPC .. B65H 2701/1762; B65H 2701/18271; B65H 2701/18292; B65H 2701/1912; B65H 2701/1914; B65H 29/10; B65H 29/125; B65H 29/22; B65H 29/28
  See application file for complete search history.

(56) References Cited

U.S. PATENT DOCUMENTS

2009/0254306 A1   10/2009   Onshima et al.
2011/0052291 A1*  3/2011    Iwakawa ............... B65H 5/34
                                                        399/388

FOREIGN PATENT DOCUMENTS

| | | |
|---|---|---|
| CN | 101446478 A | 6/2009 |
| CN | 101872501 A | 10/2010 |
| CN | 101968903 A | 2/2011 |
| CN | 101996433 A | 3/2011 |
| CN | 102722933 A | 10/2012 |
| EP | 0186442 A | 7/1986 |
| GB | 2218524 A | 11/1989 |
| JP | H 1-207613 A | 8/1989 |
| JP | 2003081463 A | 3/2003 |
| JP | 2012030937 A | 2/2012 |

OTHER PUBLICATIONS

Yiwen, Jin, *Research on Repair Methods for Urban Expressway Traffic Flow Data*, School of Electronics and Electric Engineering, Shanghai Jiao Tong University, Feb. 2008, pp. 33, 36.
International Search Report dated Jul. 11, 2013 from corresponding International Application No. PCT/CN2013/073549.

* cited by examiner

DEVICE FOR DETECTING THICKNESS OF SHEET-TYPE MEDIUM AND METHOD THEREOF

This application is the national phase of International Application No. PCT/CN2013/073549, filed on Apr. 1, 2013, which claims the benefit of Chinese Patent Application No. 201210191067.9 titled "DEVICE AND METHOD FOR DETECTING THE THICKNESS OF SHEET MEDIUM", filed with the Chinese State Intellectual Property Office on Jun. 11, 2012, which applications are hereby incorporated by reference to the maximum extent allowable by law.

FIELD OF THE INVENTION

The present application relates to a thickness detection technology, and particularly to a method and a device for continuously detecting the thickness of a sheet medium in the process of continuous convey of it.

BACKGROUND OF THE INVENTION

Currently, the degree of automatic processing of the financial currency is more and more high, in the process of automatic processing of the currency, it is desirable to obtain and detect the authenticity, new and old etc. information of the currency, so as to reduce the degree of manual intervention and to provide convenience to human on the use of the currency.

In the process of automatic processing, obtaining the thickness of the currency to be processed is a basic detection means. The thickness information can be used to determine the information of new and bad, authenticity, incompleteness or paste of tape etc. of the current currency, the above information is necessary means to determine whether the current currency meets the circulation conditions.

As shown in FIG. 1, a thickness data collecting device used commonly in a current financial self-service equipment includes a conveying roll 1 for conveying banknote, a detecting roll 2 opposite to the conveying roll 1, a plate spring 3 being arranged against the detecting roll 2 on the side opposite to the conveying roll, a distance sensor 4 arranged above the plate spring, with the distance sensor 4 being used for detecting a distance value between the plate spring 3 and the distance sensor 4. In view of the current distance detecting means, in order to obtain the thickness of a piece of banknote 5, a distance d between the sensor 4 and the plate spring 3 when no banknote is conveyed is set firstly, the distance d is referred to as a zero value of the thickness detecting device, and when the banknote passes by, the actual thickness value of the banknote being detected can be obtained by the distance data detected by the sensor 4 actually subtracting the above zero value.

It is well known that the performance of all machinery and electronic equipment will aging along with a period of use time, and the equipment will be subjected to shake due to change of the operating environment or during being moved, thus a change in performance parameter is caused thereof. In terms of the thickness detecting devices, the actual mechanical zero value may fluctuate during detecting the thickness of the banknote. When an inaccurate zero value is used, the detected thickness value is inaccurate too, thus it's unable to meet the use of the financial self-service equipment which requires high precision.

Currently, there are two methods for setting the related zero value, including:

1. fixed zero value method, that is, making the zero value $d=d_0$, where $d_0$ is a zero value constant of a factory setting. This method has the drawback as follow: when the thickness detecting device is used for a long period of time and thus aging, or the equipment is subjected to shock during being moved, the actual zero value will change, however the fixed zero value $d_0$ is still used during actual detection, so that large errors will be caused in the collected thickness data.
2. dynamic zero value method, that is, a zero value is detected each time before a banknote passes by, and which serves as the zero value for detecting this piece of banknote. This method employs real time collected data as the zero value, thus avoiding the affect caused by changes in operating environment and other factors, and being more accurate compared with the fixed zero value. However this method still has the problem as follow: because of the inherent nature of the zero value detecting device itself, there are fluctuations in the collected data, that is, the multiple zero values collected in the same environment are different from each other, when a large deviation arises in the collected zero value, a large deviation arises in the actual thickness detection value, abnormity of the collected thickness data will be caused, thus a instability of the whole self-service financial service equipment is caused.

SUMMARY OF THE INVENTION

One of the objects of the present application is to provide a device for detecting the thickness of a sheet medium which not only can effectively eliminate the problem of a large detection deviation due to the changes in operating environment, but also can avoid the problem that the detected thickness is inaccurate due to abrupt change in detection value caused by the mechanical fluctuations of the dynamic zero value.

The device for detecting the thickness of a sheet medium includes:
- a conveying roll, configured to convey a sheet medium;
- a detecting roll, arranged opposite to the conveying roll, configured to clamp and convey the sheet medium together with the conveying roll in the process of convey and is elastically displaced relative to the conveying roll;
- a sensor, configured to obtain a distance variation value between the detecting roll and the sensor;
- a thickness calculating unite, configured to calculate a sheet medium thickness value according to a distance detection value between the detecting roll and the sensor obtained by the sensor when the sheet medium passes by and a standard zero value between the detecting roll and the sensor obtained by the sensor before the sheet medium enters;

wherein the device for detecting the thickness of a sheet medium further includes:
- a zero value correcting unit, configured to correct a dynamic detection zero value between the detecting roll and the sensor obtained by the sensor before the sheet medium enters according to a zero value correcting formula to obtain the standard zero value;
- a date storing unite, configured to store a preset distance detection zero value and operating data used by the zero value correcting unit.

Preferably, the zero value correcting formula is as follow:

$$b_n = (1-t) \times b_{n-1} + t \times a_n, \ t \in (0,1)$$

where, $a_n$ is a dynamic detection zero value used in detecting the thickness of the n-th sheet medium;

bn represents a standard zero value used in detecting the thickness of the n-th sheet medium;

$b_{n-1}$ is a standard zero value used in detecting the thickness of (n−1)-th sheet medium;

n is a natural number greater than 0, and when n=1, that is, the detection is performed for the first time, $b_0 = A_0$, with $A_0$ being a preset distance detection zero value.

Specifically, the larger the correlativity coefficient t, the higher the self-adapting speed, and the worse the stability; on the contrary, the smaller the correlativity coefficient t, the lower the self-adapting speed, and the better the stability.

Particularly, when t is equal to 0, $b_n = b_{n-1} \ldots b_0 = A_0$, $b_n$ degenerates as the fixed zero value; when t is equal to 1, $b_n = a_n$, $b_n$ degenerates as the dynamic zero value; and it should be avoided that t is equal to 0 or 1, experimental result shows that when t ranges from 0.05 to 0.2, a good engineering effect can be achieved. Preferably, the t is equal to 0.2.

Preferably, the device for detecting the thickness of a sheet medium further includes a sheet medium entry determining module for determining whether sheet medium thickness detection is to be started.

Preferably, a plate spring is arranged against the detecting roll on the side opposite to the conveying roll to achieve the elastic displacement of the detecting roll relative to the conveying roll, and the sensor is placed above the plate spring and remains stationary relative to the conveying roll.

Another one of the objects of the present application is to provide a method for detecting the thickness of a sheet medium, the detecting method includes:

S1. obtaining a dynamic detection zero value between a detecting roll and a sensor before a sheet medium enters;

S2. correcting the dynamic detection zero value according to a zero value correcting formula to obtain a standard zero value;

S3. obtaining a distance detection value between the detecting roll and the sensor when the sheet medium passes through the sensor;

S4. calculating the actual thickness value of the sheet medium according to the difference between the distance detection value and the standard zero value.

Preferably, the zero value correcting formula is as follow:

$$b_n = (1-t) \times b_{n-1} + t \times a_n, \ t \in (0,1)$$

where, $a_n$ is a dynamic detection zero value used in detecting the thickness of the n-th sheet medium;

$b_n$ represents a standard zero value used in detecting the thickness of the n-th sheet medium;

$b_{n-1}$ is a standard zero value used in detecting the thickness of (n−1)-th sheet medium;

n is a natural number greater than 0, and when n=1, that is, the detection is performed for the first time, $b_0 = A_0$, with $A_0$ being a preset distance detection zero value.

Further, t ranges from 0.05 to 0.25, and preferably, the t is equal to 0.2.

As compared with the prior art, the method for detecting the thickness of a sheet medium has the advantages as follows:

1. because a real time standard zero value is adopted in the method, the problem of the detection data being inaccurate caused by actual zero value being changed because of the thickness detecting device being used for a long period of time and thus aging or the equipment being subjected to shock during being moved can be effectively solved.

2. because the real time standard zero value is obtained by weighted correcting the dynamic zero value and the historical standard zero value, the problem of the detection data being inaccurate caused by sudden fluctuations during data collection because of the inherent nature of the zero value detecting device itself can be effectively solved.

DETAILED DESCRIPTION OF THE INVENTION

In order to further illustrate the present application, technical solutions of the present application will be further described in detail hereinafter in conjunction with the accompanying drawings. According to the difference about the detection accuracy requirements on banknote thickness data, a plurality of thickness detecting devices ranging from one to dozens can be arranged, the thickness detecting devices are independent of each other, but the operating principle thereof is completely the same, only the installation positions are different.

In order to illustrate the technical solutions of the present application briefly, only one thickness detecting device is described in detail. In actual use, a plurality of the thickness detecting devices can be arranged on the path through which the banknote passes according to requirement, when the banknote passes by, the plurality of the thickness detecting devices will generate corresponding banknote thickness detection data, and when each banknote passes through the thickness detecting device, a group of thickness detection values will be generated. If the banknote is smooth, the generated group of thickness values is uniform and is the actual thickness of the banknote; if there are changes in the thickness of the banknote, for example a tape is attached to the banknote and the position of the tape is detected, the calculated group of thickness values varies accordingly.

Figure 1:
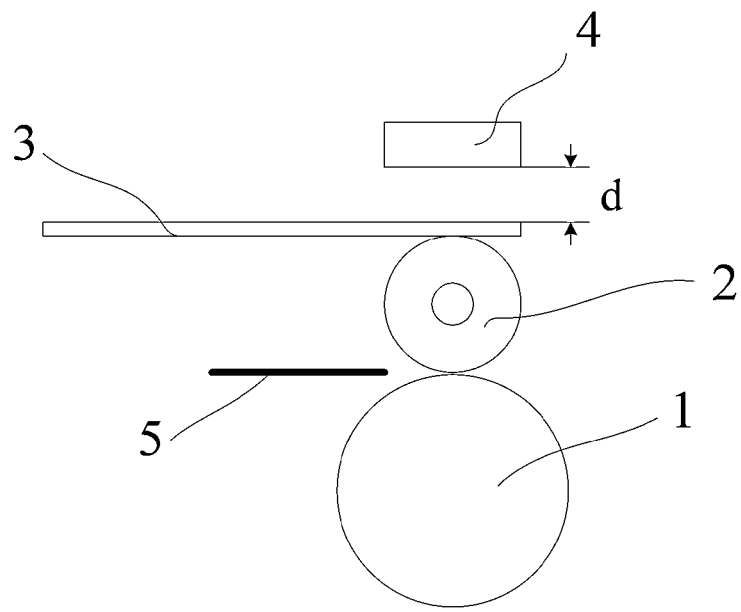
FIG. 1 is a structural schematic view of a device for collecting a thickness data used commonly currently.
Figure 2:
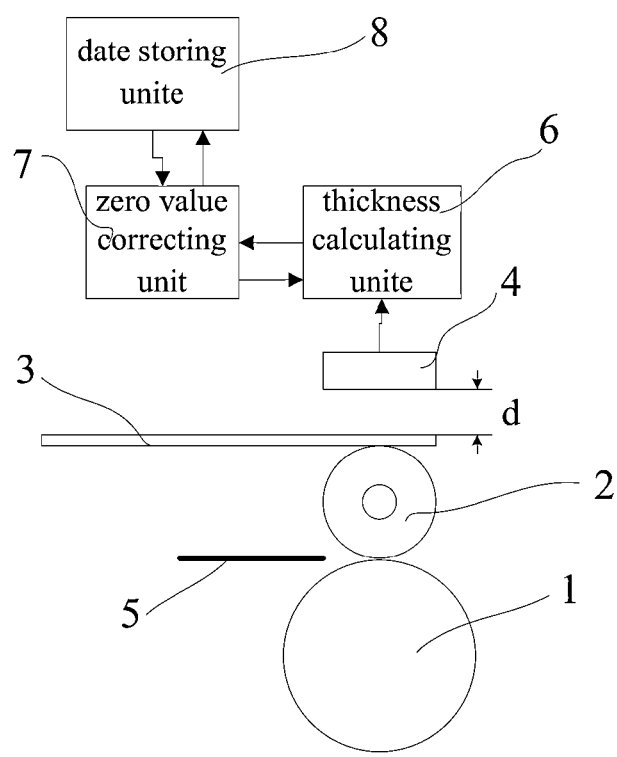
FIG. 2 is a construction schematic view of a device for detecting the thickness of a sheet medium according to the present application.

Referring to FIG. 2, the device for detecting the thickness of a sheet medium according to the present application includes:

a conveying roll 1 for conveying a sheet medium; a detecting roll 2 that is opposite to the conveying roll 1 for clamping and conveying the sheet medium together with the conveying roll in the process of convey and is elastically displaced relative to the conveying roll; a plate spring 3 arranged against the detecting roll 2 on the side opposite to the conveying roll 1; a sensor 4 arranged above the plate spring for obtaining a distance variation value between the plate spring 3 and the sensor 4; a thickness calculating unite 6 configured to calculate a sheet medium thickness value according to a distance detection value between the plate spring 3 and the sensor 4 obtained by the sensor 4 when the sheet medium passes by and a standard zero value between the plate spring 3 and the sensor obtained by the sensor 4 before the sheet medium enters. In order to obtain an accurate standard zero value, the device for detecting the thickness of a sheet medium further includes: a zero value correcting unit 7 for correcting a dynamic detection zero value between the detecting roll and the sensor obtained by the sensor before the sheet medium enters according to a zero value correcting formula to obtain the standard zero value; and a date storing unite 8 for storing a preset distance detection zero value and operating data for the zero value correction.

It should be noted that the use of plate spring 3 in the present embodiment is merely one solution for achieving the elastic displacement of the detecting roll 2 relative to the conveying roll 1, in order to achieve this elastic displacement, the people skilled in the art may also employ the means of a spring pulling or of a torsion spring limiting to a rotating shaft of the detecting roll, which will not be described in detailed herein. Of course, in a solution the above plate spring is not used, the sensor 4 can directly obtain the distance information between the detecting roll 2 and the sensor 4 to calculate the thickness value of the sheet medium passing by.

Figure 3:
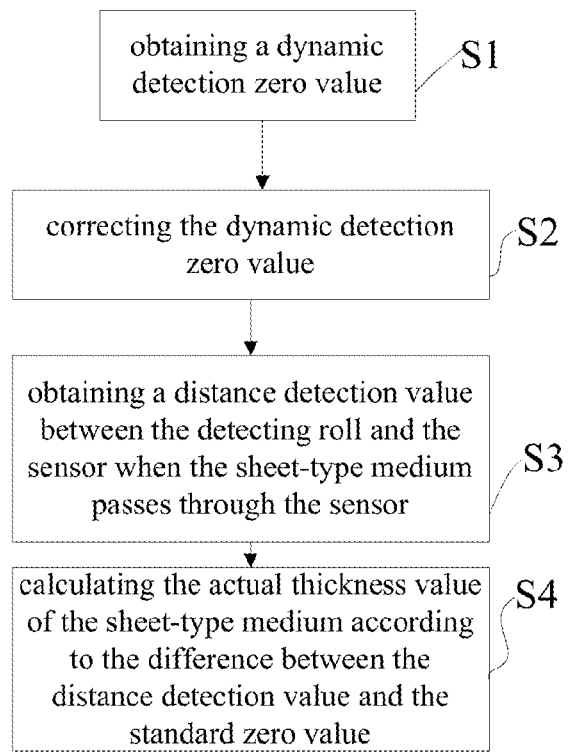
FIG. 3 is a flow schematic diagram of a method for detecting the thickness of a sheet medium according to the present application.

Referring to FIG. 3, the process of detecting the thickness of a sheet medium carried out by the device for detecting the thickness of a sheet medium according to the present application includes steps as follows:

S1. obtaining a dynamic detection zero value between a detecting roll and a sensor before a sheet medium enters;

S2. correcting the dynamic detection zero value according to a zero value correcting formula to obtain a standard zero value;

S3. obtaining a distance detection value between the detecting roll and the sensor when the sheet medium passes through the sensor;

S4. calculating the actual thickness value of the sheet medium according to the difference between the distance detection value and the standard zero value.

Here, the correcting formula employed in the present embodiment is as follow:

$$b_n=(1-t)\times b_{n-1}+t\times a_n \quad t\in(0,1)$$

where, $a_n$ is a dynamic detection zero value used in detecting the thickness of the n-th sheet medium;

$b_n$ represents a standard zero value used in detecting the thickness of the n-th sheet medium;

$b_{n-1}$ is a standard zero value used in detecting the thickness of (n−1)-th sheet medium;

n is a natural number larger than 0, and when n=1, that is, the detection is performed for the first time, $b_0=A_0$, with $A_0$ being a preset distance detection zero value.

Specifically, the larger the correlativity coefficient t, the higher the self-adapting speed, and the worse the stability; on the contrary, the smaller the correlativity coefficient t, the lower the self-adapting speed, and the better the stability.

Particularly, when t is equal to 0, $b_n=b_{n-1} \ldots b_0=A_0$, $b_n$ degenerates as a fixed zero value; when t is equal to 1, $b_n=a_n$, $b_n$ degenerates as a dynamic zero value; and it should be avoided that t is equal to 0 or 1, experimental result shows that when t ranges from 0.05 to 0.2, a good engineering effect can be achieved. Preferably, the t is equal to 0.2.

The above embodiment described above is merely one of the embodiments for achieving the second object of the present application, optimizations can be made by the people skilled in the art applying any prior art known to them, for example, in order to accurately obtain a dynamic zero value data, a sheet medium entry determining module may be added to the device for detecting the thickness of a sheet medium, so as to guide the sensor to collect and obtain accurate dynamic zero value.

Next, in order to further illustrate the advantage of the method for detecting the thickness of a sheet medium according to the present application as compared with the method for detecting thickness in the prior art, the following experimental data are provided.

Figure 4:
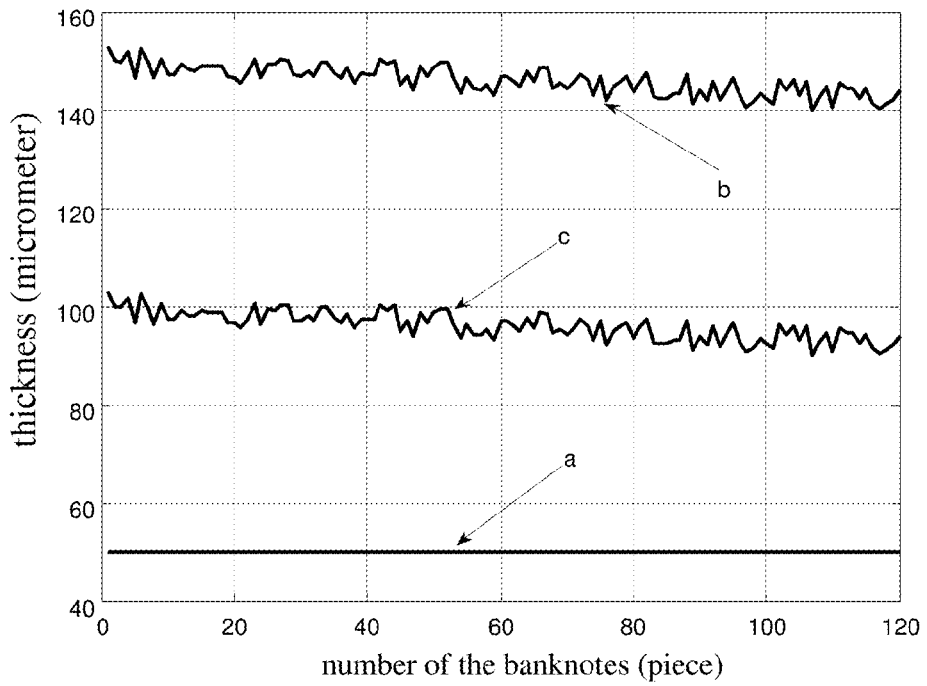
FIG. 4 is a data statistical chart related to sheet medium thickness detection performed by adopting a fixed zero value method.

FIG. 4 is a data statistical chart related to sheet medium thickness detection performed by adopting a fixed zero value method. A initial fixed zero value of the device for detecting the thickness of a sheet medium is determined firstly, the means generally used in the prior art is that, before the device for detecting the thickness of a sheet medium is used, the detection zero value d when no medium enters is detected by N (N>0) times, each of the detection zero values is $U_1, U_2, \ldots, U_N$, the corresponding fixed zero value can be calculated through a formula as follow:

$$A_0=(U_1+U_2+ \ldots +U_N)/N$$

The preset fixed zero value for sheet medium thickness detection used in the present experiment is 50 micrometers.

Then, by using the above fixed zero value as the standard zero value for sheet medium thickness detection, the experimental thickness data is collected by using a standard test medium with a thickness of 100 micrometers. With the horizontal coordinate representing the number of the test medium, i.e. the sequence of the test medium, and with the vertical coordinate representing the thickness data, and the unit is micrometer, a statistical chart as shown in FIG. 4 is formed, where the lower data line a represents the standard zero value used for calculating the thickness data of each test medium, that is the preset fixed zero value 50 micrometers, the upper data line b represents the collected detection thickness value of each test medium, and the intermediate data line c represents the detection thickness value of test medium that is calculated according to the difference between the detection thickness value and the preset fixed zero value.

As can be seen from FIG. 4, when the test environment of the device for detecting the thickness of a sheet medium is changed, the data line b drifts downward, which thus results in that finally calculated data line c, that is the detection thickness value, is completely away from the real thickness 100 micrometers of the standard test medium, thereby serious detect errors are caused.

Figure 5:
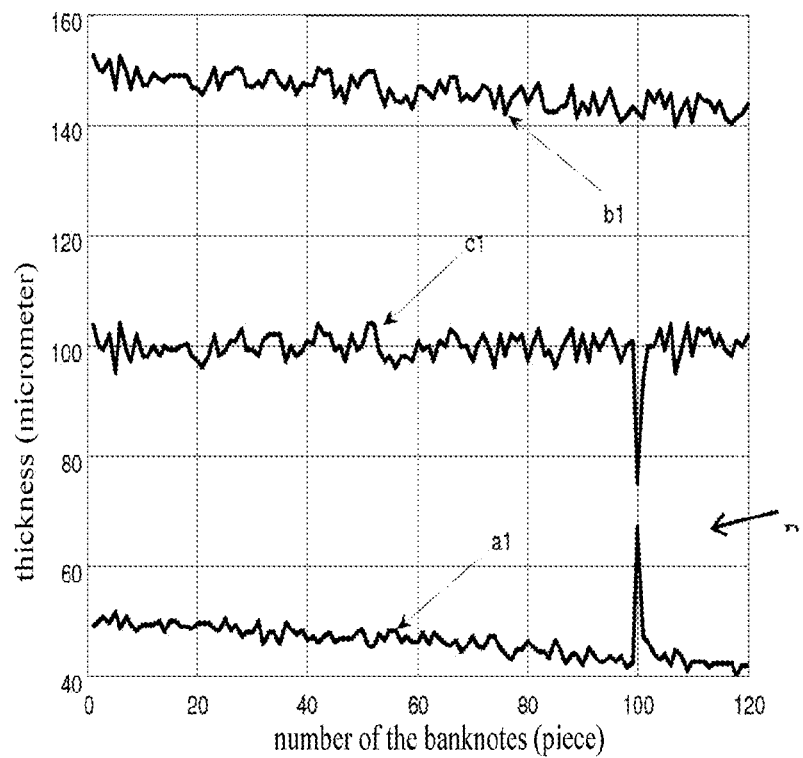
FIG. 5 is a data statistical chart related to sheet medium thickness detection performed by adopting a dynamic zero value method.

FIG. 5 is a data statistical chart related to sheet medium thickness detection performed by adopting a dynamic zero value method, similarly, the experimental thickness data is collected by using a standard test medium with a thickness of 100 micrometers. With the horizontal coordinate representing the number of the test medium, i.e. the sequence of the test medium, and with the vertical coordinate representing the thickness data, and the unit is micrometer, a statistical chart as shown in FIG. 5 is formed, where the lower data line a1 represents the standard zero value used for calculating the thickness data of each test medium, that is the dynamic zero value collected before each time of collecting the detection thickness value of the test medium, the upper data line b1 represents the collected detection thickness value of each test medium, and the intermediate data line c1 represents the detection thickness value of test medium that is calculated according to the difference between the detection thickness value and the dynamic zero value.

As can be seen from FIG. 5, because of the jitter of the detection components, large fluctuations are generated in data collection, such as the point p in the Figure. When an instantaneous large deviation arises in the collected zero value, the finally calculated detection thickness value largely deviates from the standard 100 micrometers, thereby causing the detected thickness data being severely abnormal.

Figure 6:
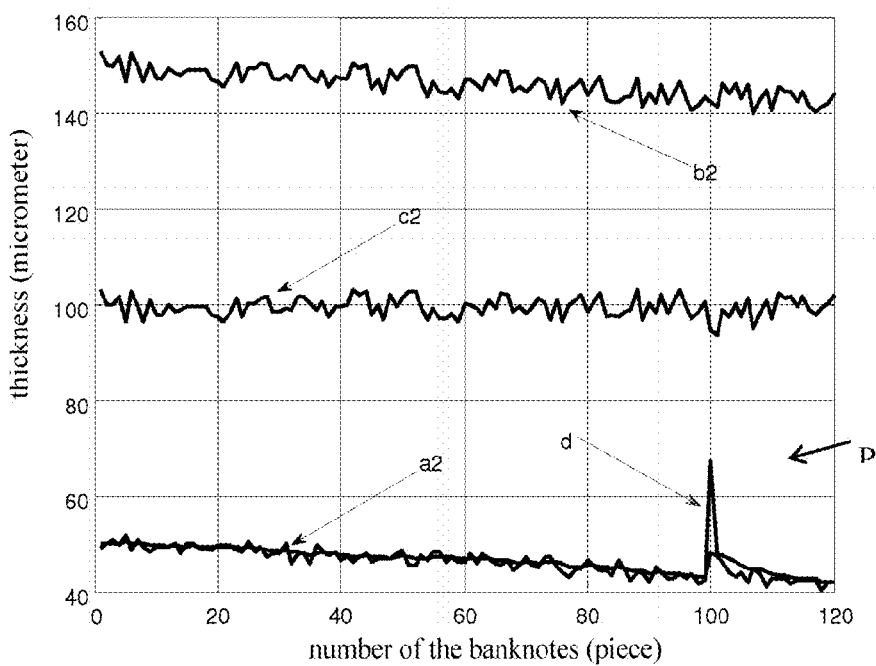
FIG. 6 is a data statistical chart related to sheet medium thickness detection performed by adopting the method according to the present application.

Referring to FIG. 6, a data statistical chart related to sheet medium thickness detection performed by adopting the method according to the present application is illustrated.

Similarly, the experimental thickness data is collected by using a standard test medium with a thickness of 100 micrometers, with the horizontal coordinate represents the number of the test medium, i.e. the sequence of the test medium, and with the vertical coordinate represents the thickness data, and the unit is micrometer, the statistical chart as shown in FIG. 6 is formed, where the lower data line a2 represents the standard zero value used for calculating the thickness data of each test medium, that is the standard zero value obtained by correcting the dynamic zero value d collected before each time of collecting the detection thickness value of the test medium according to a correcting formula, the upper data line b2 represents the collected detection thickness value of each test medium, and the intermediate data line c2 represents the detection thickness value of test medium that is calculated according to the difference between the detection thickness value and the dynamic zero value.

The correcting formula employed is as follow:

$$b_n = (1-t) \times b_{n-1} + t \times a_n \quad t \in (0,1)$$

where
1) $a_n$ represents a dynamic zero value collected before the n-th banknote passes by; if the dynamic zero value method is employed, $a_n$ is a dynamic zero value used in detecting the n-th banknote;
2) $b_n$ represents a self-adapting zero value used in detecting the n-th banknote; $b_{n-1}$ is a self-adapting zero value used in detecting the (n−1)-th banknote;
3) n is a natural number larger than 0, and when n=1, that is, the detection is performed for the first time, $b_0 = A_0$, with $A_0$ being a preset distance detection zero value;
4) t is a correlativity coefficient, 0<t<1; the larger the t, the higher the self-adapting speed, and the worse the stability; on the contrary, the smaller the t, the lower the self-adapting speed, and the better the stability.
5) particularly, when t is equal to 0, $b_n = b_{n-1} \ldots b_0 = A_0$, and $b_n$ degenerates as the fixed zero value; when t is equal to 1, $b_n = a_n$, $b_n$ degenerates as the dynamic zero value; and it should be avoided that t is equal to 0 or 1, when t ranges from 0.05 to 0.2, a good engineering effect can be achieved.

The present experimental test takes t=0.2 as an example, in the present method, the standard zero value calculating formula of the n-th banknote is as follow: $b_n = 0.8 \times b_{n-1} + 0.2 \times a_n$, where $b_0 = A_0 = 50$ micrometers.

As can be seen from FIG. 6, the standard zero value formed after being corrected through the zero value correcting method according to the present application renders the finally calculated detection thickness value does not seriously deviate from the thickness value 100 micrometers of the standard medium. Thus, the solution not only can solve the problem of the detection data being inaccurate caused by aging of the detecting device and changing in environment, but also can solve the problem of the detection data being inaccurate caused by sudden fluctuations during data collection because of the inherent nature of the zero value detecting device itself.

The above-described embodiments are only preferred embodiments of the present application, it goes without saying that the scope of the claims thereof can be limited to this, It should be noted that, for the person skilled in the art, many modifications and improvements may be made to the present application without departing from the principle of the present application, and these modifications and improvements are also deemed to fall into the protection scope of the present application.

The invention claimed is:

1. A device for detecting the thickness of a sheet medium, comprising:
   a conveying roll, configured to convey a sheet medium;
   a detecting roll, arranged opposite to the conveying roll, configured to clamp and convey the sheet medium together with the conveying roll in the process of convey and is elastically displaced relative to the conveying roll;
   a sensor, configured to obtain a distance variation value between the detecting roll and the sensor;
   a thickness calculating unit, configured to calculate a sheet medium thickness value according to a distance detection value between the detecting roll and the sensor obtained by the sensor when the sheet medium passes by and a standard zero value between the detecting roll and the sensor obtained by the sensor before the sheet medium enters;
   wherein the device for detecting the thickness of a sheet medium further comprises:
   a zero value correcting unit, configured to correct a dynamic detection zero value between the detecting roll and the sensor obtained by the sensor before the sheet medium enters according to a zero value correcting formula to obtain the standard zero value;
   a date storing unit, configured to store a preset distance detection zero value and operating data used by the zero value correcting unit.

2. The device for detecting the thickness of a sheet medium according to claim 1, wherein the zero value correcting formula is as follow:

$$b_n = (1-t) \times b_{n-1} + t \times a_n \quad t \in (0,1)$$

where, $a_n$ is a dynamic detection zero value used in detecting the thickness of the n-th sheet medium;
$b_n$ represents a standard zero value used in detecting the thickness of the n-th sheet medium;
$b_{n-1}$ is a standard zero value used in detecting the thickness of (n−1)-th sheet medium;
n is a natural number greater than 0, and when n=1, that is, the detection is performed for the first time, $b_0 = A_0$, with $A_0$ being a preset distance detection zero value.

3. The device for detecting the thickness of a sheet medium according to claim 2, wherein t ranges from 0.05 to 0.25.

4. The device for detecting the thickness of a sheet medium according to claim 2, wherein the t is equal to 0.2.

5. The device for detecting the thickness of a sheet medium according to claim 4, further comprising a sheet medium entry determining module, configured to determine whether sheet medium thickness detection is to be started.

6. The device for detecting the thickness of a sheet medium according to claim 1, wherein a plate spring is arranged against the detecting roll on the side opposite to the conveying roll to achieve the elastic displacement of the detecting roll relative to the conveying roll.

7. The device for detecting the thickness of a sheet medium according to claim 6, wherein the sensor is arranged above the plate spring and relatively static to the conveying roll.

8. A method for detecting the thickness of a sheet medium, comprising:
S1. obtaining a dynamic detection zero value between a detecting roll and a sensor before a sheet medium enters;
S2. correcting the dynamic detection zero value according to a zero value correcting formula to obtain a standard zero value;
S3. obtaining a distance detection value between the detecting roll and the sensor when the sheet medium passes through the sensor;
S4. calculating the actual thickness value of the sheet medium according to the difference between the distance detection value and the standard zero value.

9. The method for detecting the thickness of a sheet medium according to claim 8, wherein the zero value correcting formula is as follow:

$$b_n = (1-t) \times b_{n-1} + t \times a_n \quad t \in (0,1)$$

where, $a_n$ is a dynamic detection zero value used in detecting the thickness of the n-th sheet medium;
$b_n$ represents a standard zero value used in detecting the thickness of the n-th sheet medium;
$b_{n-1}$ is a standard zero value used in detecting the thickness of (n−1)-th sheet medium;
n is a natural number greater than 0, and when n=1, that is, the detection is performed for the first time, $b_0 = A_0$, with $A_o$ being a preset distance detection zero value.

10. The method for detecting the thickness of a sheet medium according to claim 9, wherein t ranges from 0.05 to 0.25.

11. The method for detecting the thickness of a sheet medium according to claim 9, wherein the t is equal to 0.2.

12. The device for detecting the thickness of a sheet medium according to claim 3, wherein the t is equal to 0.2.

13. The method for detecting the thickness of a sheet medium according to claim 10, wherein the t is equal to 0.2.

* * * * *